United States Patent [19]

Johansson

[11] Patent Number: 4,525,408

[45] Date of Patent: Jun. 25, 1985

[54] INSULATION OF ALUMINUM PROFILES IN A FIXTURE

[75] Inventor: Lars Johansson, Åseda, Sweden

[73] Assignee: Integral Profilsystem Ab, Åseda, Sweden

[21] Appl. No.: 530,426

[22] Filed: Sep. 8, 1983

[30] Foreign Application Priority Data

Sep. 9, 1982 [SE] Sweden ............................... 8205119

[51] Int. Cl.[3] .......................... B32B 3/12; B32B 7/04

[52] U.S. Cl. ................................... 428/159; 428/166; 428/178; 428/319.1

[58] Field of Search .......................... 428/34, 121-130, 428/80, 81, 83, 122, 159, 160, 166, 178, 188, 319.1, 304.4, 215; 156/79

[56] References Cited

U.S. PATENT DOCUMENTS

| | | | |
|---|---|---|---|
| 4,030,263 | 6/1977 | Lacombe | 428/122 |
| 4,113,905 | 9/1978 | Kessler | 428/34 |
| 4,189,520 | 2/1980 | Gauchel | 428/215 |
| 4,312,905 | 1/1982 | Kreusel | 428/122 |
| 4,341,831 | 7/1982 | Kleiss | 428/319.1 |
| 4,348,435 | 9/1982 | Mistrick et al. | 428/34 |

FOREIGN PATENT DOCUMENTS

| | | | |
|---|---|---|---|
| 69368 | 1/1983 | European Pat. Off | 428/304.4 |
| 66918 | 4/1980 | Japan | 428/159 |

*Primary Examiner*—William J. Van Balen
*Attorney, Agent, or Firm*—Ziems, Walter & Shannon

[57] ABSTRACT

Insulated composite aluminum profile, a method and a device for manufacturing thereof. The composite profile comprises two separate profile portions provided with grooves. Plastic strips engage the grooves in order to interconnect the profile portions and form an enclosed space for an insulating plastic foam. The profile portions are placed in a fixture, which determines the dimensions of the composite profile and the plastic foam is inserted in the space in order to expand and cure therein. Thence, the profile is removed from the fixture and eventually rolled as to the outer rims of the grooves, which are deformed and thereby fix the plastic strip.

7 Claims, 18 Drawing Figures

INSULATION OF ALUMINUM PROFILES IN A FIXTURE

The present invention relates to an insulated composite aluminum profile, a method for producing such aluminum profiles in a fixture and a device for manufacturing the aluminum profile.

At the building of windows, doors, facade portions and similar, aluminum profiles of different shapes are often used. In order to prevent or obstruct the heat transport from the interior of the house to its outside through such aluminum profiles, so called cold bridges, an insulation must be arranged between the outer and inner portions of the profile.

In this connection it is previously known to construct the profile in two portions which are interconnected by means of insulating plastic foam.

A method which is often used is disclosed in the Swedish patent application No. 7176/71 wherein the two portions are interconnected by means of two plastic ledges or strips in order to form an enclosed space, in which a plastic foam is allowed to expand. The plastic foam exerts a pressure and urges the profiles from each other as much as is allowed by the plastic strips.

A drawback with said system is that the tolerances of each section and the plastic strips are added and give an end product with too big tolerances. In connection with e.g. window frames, those tolerances have given problems.

An attempt to overcome this drawback is disclosed in the Swedish patent specification No. SE-B-7107649-1. Said patent specification describes that the two profile sections are manufactured connected to each other by means of two removable webs. Thus, the plastic foam is introduced in a space formed already at the manufacturing or extrusion of the aluminum profile and is allowed to expand and cure therein. Thereupon, the webs are removed and an insulated composite profile is formed. The drawback with said construction is that the plastic foam is the only material which interconnects the two sections. A so called integral foam is used, which has a greater density at the surface than in the centre thereof. The integral foam does not have as good insulating properties as the plastic foam having homogeneous and low density. Moreover, the mechanical stability of the construction will be decreased. Finally the surface of the plastic foam will be exposed to the atmosphere and is easily affected by moisture and similar.

The object of the present invention is to provide an insulated composite aluminum profile, in which close tolerances are achievable.

Another object of the invention is to provide an insulated composite aluminum profile where the insulating plastic foam is protected by a strip of hard plastic, which is positioned in essentially the same plane or surface as the surrounding surface in order to form a resistive and easily cleanable surface without water pockets. The hard plastic strip also gives a certain mechanical stability to the profile.

Thus, the present invention comprises a method for manufacturing an insulating composite profile, comprising at least two profile sections, preferably of aluminum, having grooves, which preferably are undercut, in which plastic strips, preferably manufactured by hard plastic, engage in order to interconnect the profile sections to form an enclosed space, which contains an insulating plastic foam. According to the invention the separate profile sections are placed in a fixture, the plastic strips first being inserted in the grooves. Thus, the fixture determines the dimensions of the composite profile when formed. In the enclosed space, a plastic foam is introduced and is allowed to expand and cure, whereupon the composite profile is formed. After removing this composite profile from the fixture, the outer edges of the grooves are eventually rolled in order to fix the plastic strip and eventually to absorb clearances between the grooves and the plastic strips.

The invention also relates to a composite profile produced according to the method and a device for producing the composite profile.

The invention is described more in details below by reference to preferred embodiments of the invention which are shown on the drawings.

FIGS. *7a* and *7b* are elevational views of the rolling machinery.

Figure 2:
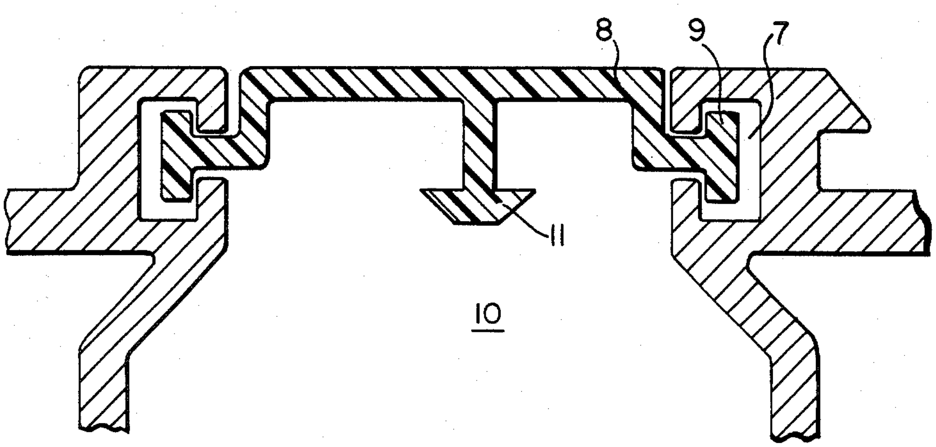
FIG. 2 is an enlarged cross-sectional view of the encircled area II—II of FIG. 1.
Figure 8:
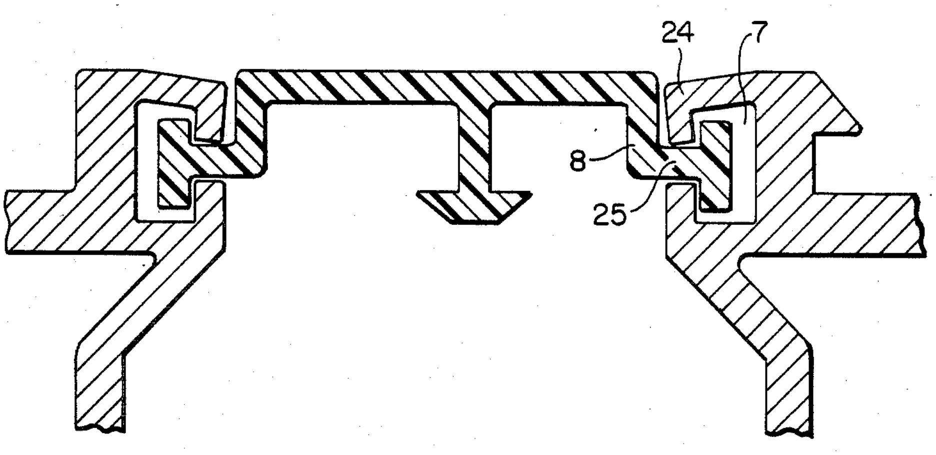

FIG. 8 is an enlarged cross-sectional view similar to FIG. 2 after that the profile has passed the rolling machinery.

FIGS. 9 to 12 are cross-sectional views of different interconnected aluminum profiles.

FIGS. 13 to 16 are cross-sectional views of combinations of plastic profiles and aluminum profiles to a composite profile according to the present invention.

Figure 17:
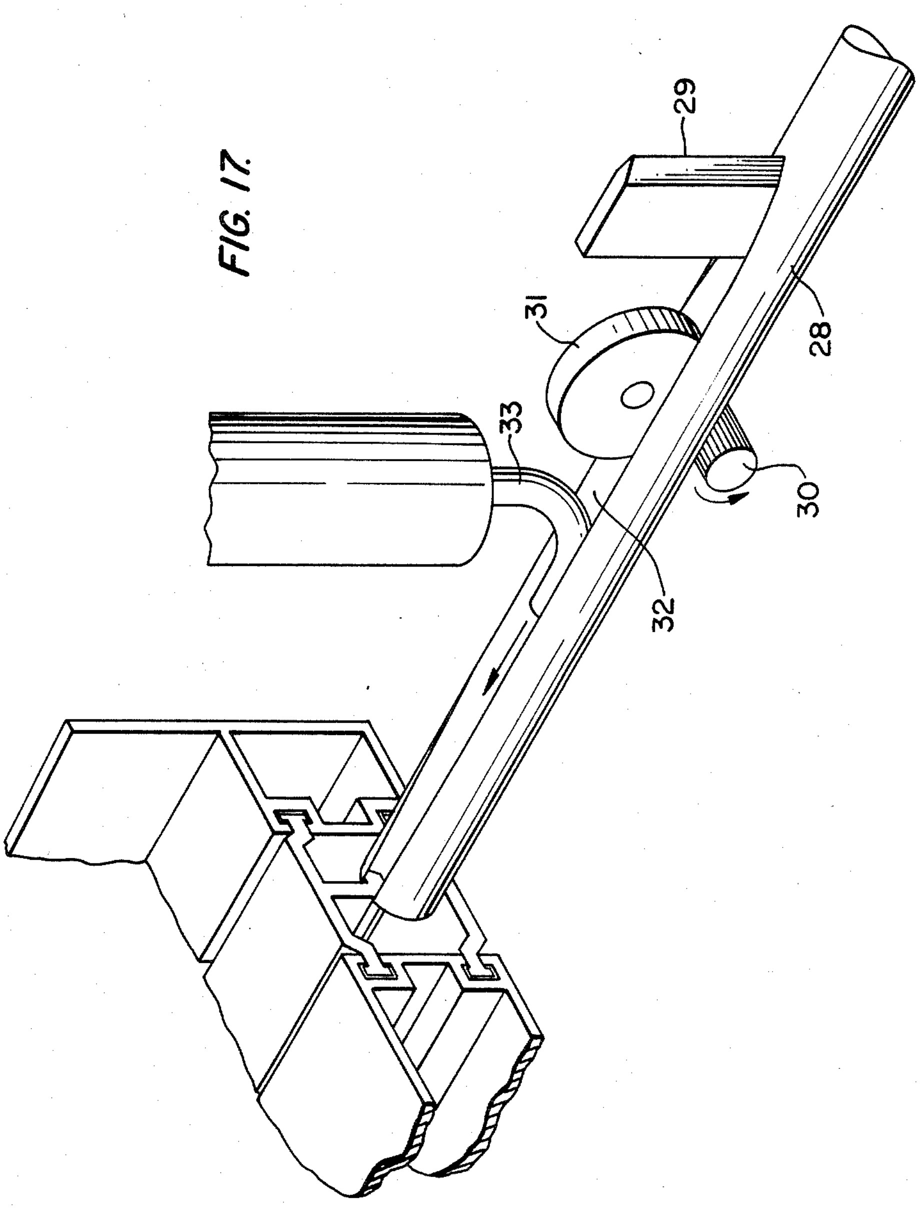

FIG. 17 is a perspective view showing a method for application of plastic foam in the space of the aluminum profile.

Figure 1:
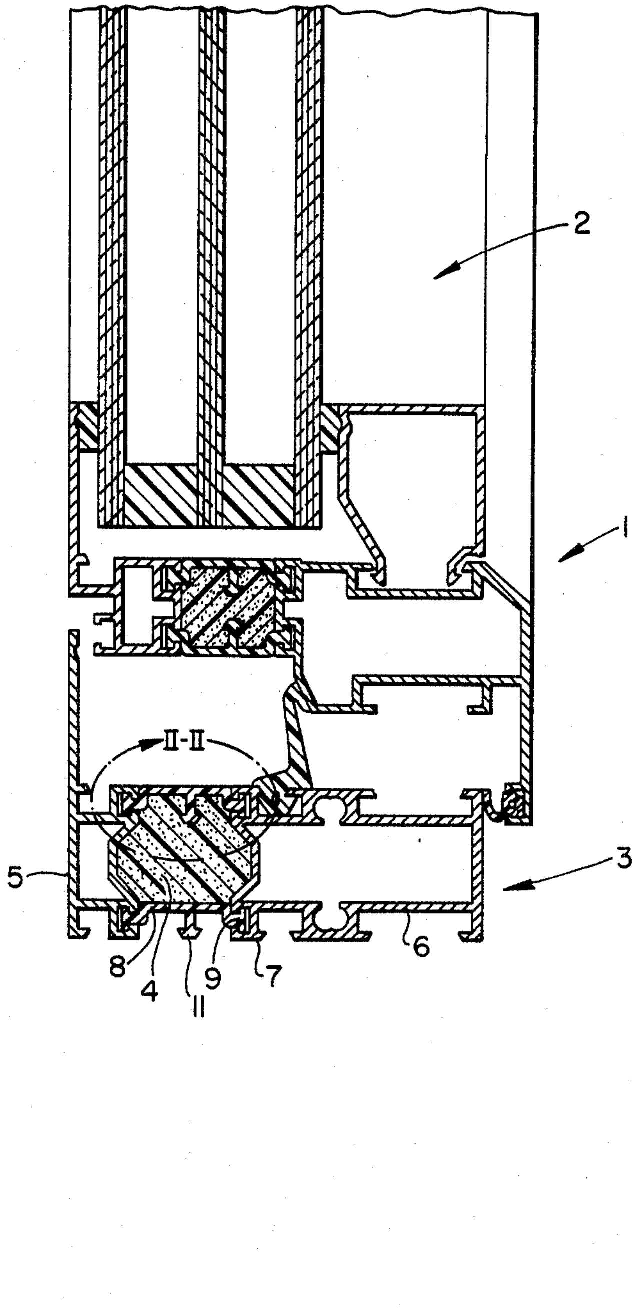
FIG. 1 is a cross-sectional elevation view of an aluminum profile intended to be mounted in a window.

FIG. 1 is a cross-sectional view of an insulated aluminum profile according to the invention, which is used for providing a window frame. Thus, FIG. 1 shows a first frame 1, which is intended to support the glassing unit 2 of the window and a second frame 3. The two frames are composed of several, separate profile portions according to known technique. The frames comprise an insulation 4 of plastic foam. The insulations of the frames are made in the same manner and thus it is only described how the insulation is made on the frame 3.

FIG. 2 is an enlarged view of the portion II—II encircled in FIG. 1. The frame 3 comprises a profile portion 5 facing the outside of the house, and a profile portion 6 facing the interior of the house. The profile portions comprise undercut grooves 7 intended to engage with complementary shaped edges 9 of a plastic strip 8, which preferably is made of hard plastic. A plastic strip is intended to be inserted in the grooves 7 in order to interconnect the two profile portions. In order to be insertable in the grooves 7, the edges 9 of the plastic strips must easily fit in the grooves 7 and thus form a clearance in the grooves when they are inserted therein.

Figure 3:
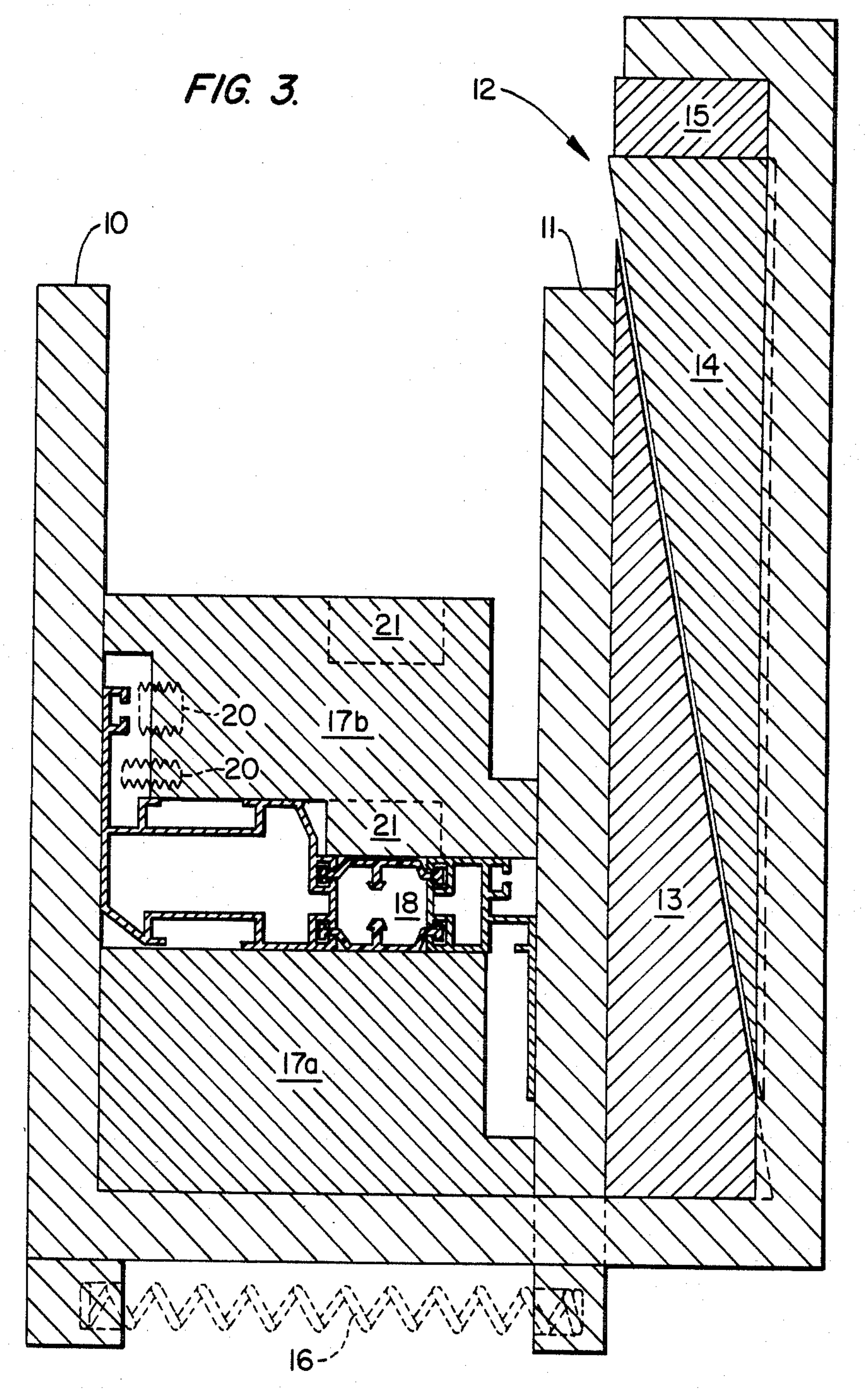
FIG. 3 is a schematical cross-sectional elevation view of a fixture according to the invention.

In order to obtain the tolerances which are required within this field, the two profile portions 5, 6 are placed in a fixture. The fixture is schematically shown in FIG. 3 and comprises two essentially vertical side portions 10 and 11. The side portion 10 is fixed while the side portion 11 is adjustable by means of a key system 12, which comprises two mutually engaging keys 13 and 14. The key 14 is adjustable as to its high position by means of gauge blocks 15, which have different sizes for different distances between the side portions 10 and 11. A spring 16 urges the key 13 of the side portion 11 against the free key 14. By means of the gauge block 15, the distance between the side portions 10 and 11 is carefully adjusted.

In the space thus formed, mold portions 17*a*, 17*b* are placed. The mold portions are so shaped that a mold space is formed between them for receiving the composite profile. The lowermost mold portion 17*a* has a plane lower surface while the intermediate mold portion 17*b* . . . has both the upper surface and the lower surface thereof shaped correspondingly to the profile which is to be made.

Figure 4:
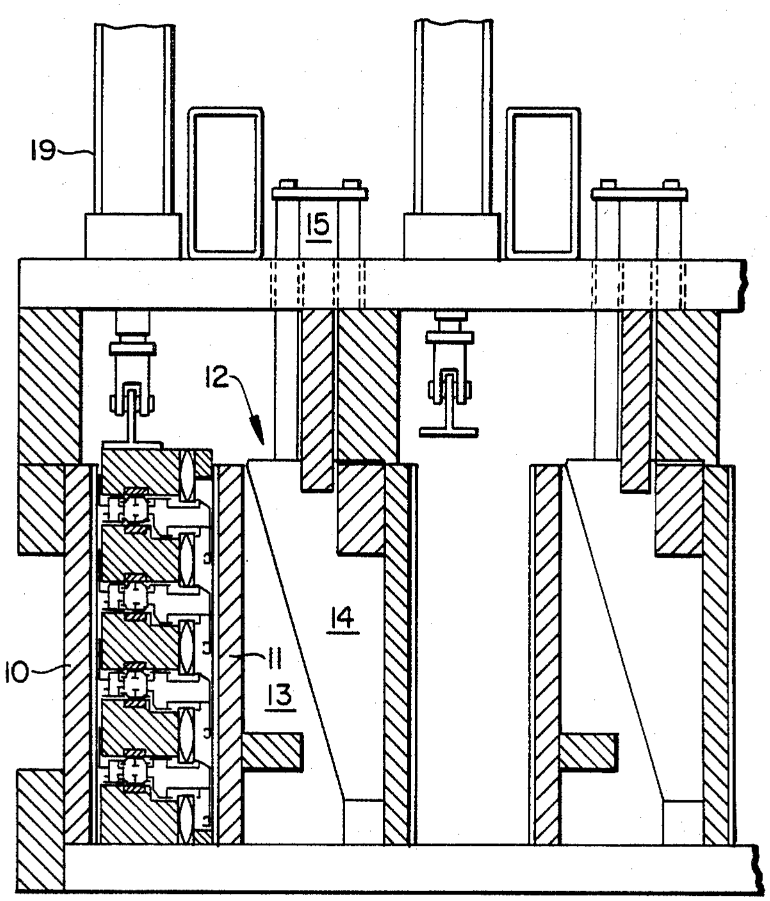
FIG. 4 is a more detailed cross-sectional elevation view of the fixture.
Figure 5:
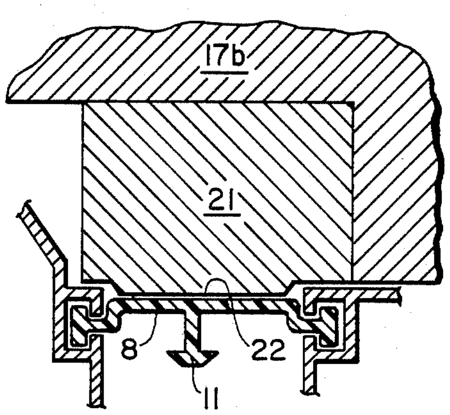
FIG. 5 is an enlarged cross-sectional view of the details of the fixture.

The fixture is loaded by first placing the lowermost mold portion 17*a* in the fixture 10, 11, whereupon a composite profile 2 having the plastic strip 8 positioned in the grooves, is placed above the mold portion 17*a* and a new mold portion 17*b* is placed there above and so on. Each profile has a length of e.g. 6 meters and each fixture can comprise a selected number of stacked profiles. FIG. 4 shows a more detailed embodiment of the fixture according to the invention. The fixture can comprise several adjacent side portions 10, 11 so that several groups of profiles are simultaneously made.

The space 18 which is to be filled with plastic foam is available from both ends and is closed by plugs, each provided with a valve. The plug is constructed to allow the exhaust of air until the foaming plastic material reaches the plug, whereupon this material closes the valve and prevents the plastic foam from being forced out of the space 18. In this manner a pressure can be built up inside the space 18.

The insertion of the plastic foam in the space 18 is made in a known manner, whereby the two components of the plastic foam are sprayed against each other until complete mixing, whereupon the mixture is ejected through a nozzle. The nozzle is inserted in the plug and a suitable amount of plastic foam is ejected inside the space and is allowed to react. The plastic foam enters the space 18 immediately after the mixing and is ejected along the whole length of the profile so that it achieves an equal distribution. The reaction starts immediately and a gas, freon, is formed, which brings about the foaming and expansion of the plastic. Thus, an inner pressure is built up inside the space 18, which closes the valves of the plugs. The continued expansion entails that the plastic foam urges the plastic strips 8 upwards against the mold portions 17*a*, 17*b* and the profile portions upwards against the respective fixture side portions 10, 11. Thus, the dimensions of the aluminum profile will be carefully determined by the fixture. After the expansion of the foam material, it is cured and fills up the whole space 18.

In order that the plastic foam shall expand in the right way and exert the intended pressure and cure within a reasonable time, the space 18 must have a temperature in the range of 30°–40° C. This is easily achieved by known means.

In certain cases it is uncertain if the expansion of the plastic foam succeeds in urging the aluminum profile portions against the fixture side portions 10, 11. For this reason, the mold portions 17*a*, 17*b* can be provided with bellows 20 which is shown in broken lines in FIG. 3. The bellow 20 is connected to an air pressure source and urges the profile out towards the respective side portion 10, 11.

A problem which can arise is that the plastic foam is squeezed out through the clearances which are available between the grooves 7 and the edges 9 of the plastic strip 8. If so, the plastic foam can escape outside the space 18, which is not desirable. In order to avoid this problem, each mold portion can be provided with an insert 21, which directly abuts the plastic strip 8 and presses it downwards so that a sealing is obtained at the two edges of the plastic strip. In this manner it is avoided that the plastic foam can be squeezed out through the grooves 7. It is also possible to use the internal pressure of the plastic foam in order to urge the plastic strips outwards as is shown in FIG. 2, whereby the plastic foam, which enters the grooves 7, cannot pass further outwards.

Figure 6:
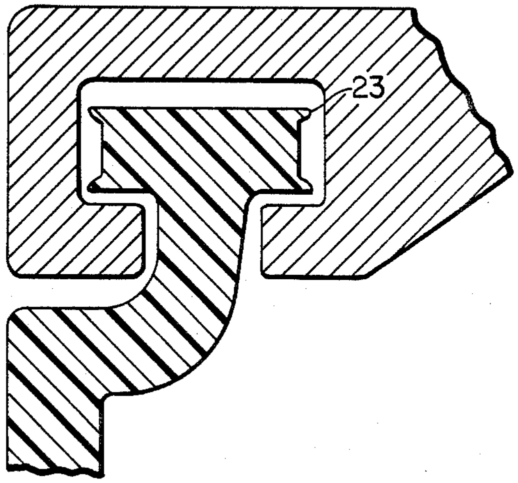
FIG. 6 is a cross-sectional enlarged view of another embodiment of the plastic strip.

Another possibility to solve this problem is to provide projecting sealing edges 23 to the edges of the plastic strip as is shown in FIG. 6 in order to form a labyrinth sealing which retards the plastic foam so much that is has time to cure.

In order that the insert 21 shall exert a suitable pressure to the plastic strip, pneumatic cylinders 19 are arranged to exert a predetermined pressure on the uppermost mold portion, compare FIG. 4.

When a certain time has passed from the insertion of the plastic foam material and this has expanded and partially cured, the pressure in the air cylinders are relieved and the plastic foam may finally cure.

The profile made in this manner has a mechanical stability. The plastic strips, together with the aluminum profile, form essentially smooth surfaces, which are easy to clean. Above all, no water pockets are formed so that no drainage of the profile is required in connection with the plastic foam insulation. The drainage can be placed at another position. In this way, no moisture films are formed, which can influence on and decrease the insulation ability.

Sometimes there are problems regarding the uniform distribution of the plastic foam before it has reacted, since the profiles are rather long. As described above, the fluid mixture is ejected from one end of the profile.

Another method which makes it possible to depose expanding material in a space quickly, equally and without spill is shown in FIG. 17, which is a schematic, perspective view of the device for performing the method.

In FIG. 17 there is shown two aluminum profiles 5, 6 interconnected by two plastic strips 8 as previously described. The plastic profile has the stud 11 extending inwardly towards the space 10. A thin plastic pipe 28 is cut longitudinally by a sharp edge 29. A driving shaft 30, which cooperates with an idling roll 31 feeds the pipe to the left in FIG. 17. In the trough 32 thus formed the mixed fluid is deposed by a nozzle 33 with the same velocity as the feeding speed of the pipe 28. The pipe is guided by the stud 11 and is inserted in the space 10 in the manner shown in FIG. 17. When whole the pipe 28 has been inserted in the space 10, the reaction forces the fluid inside the pipe to expand and escape from the pipe 28 inside the space 10 as previously described.

Figure 7B:
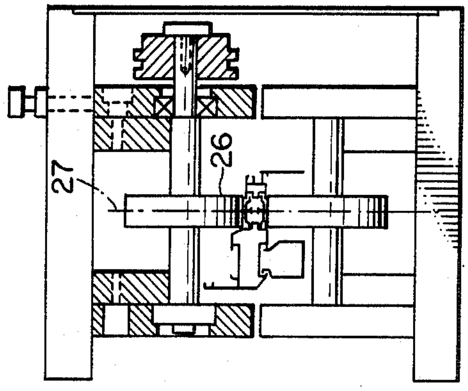
Figure 7A:
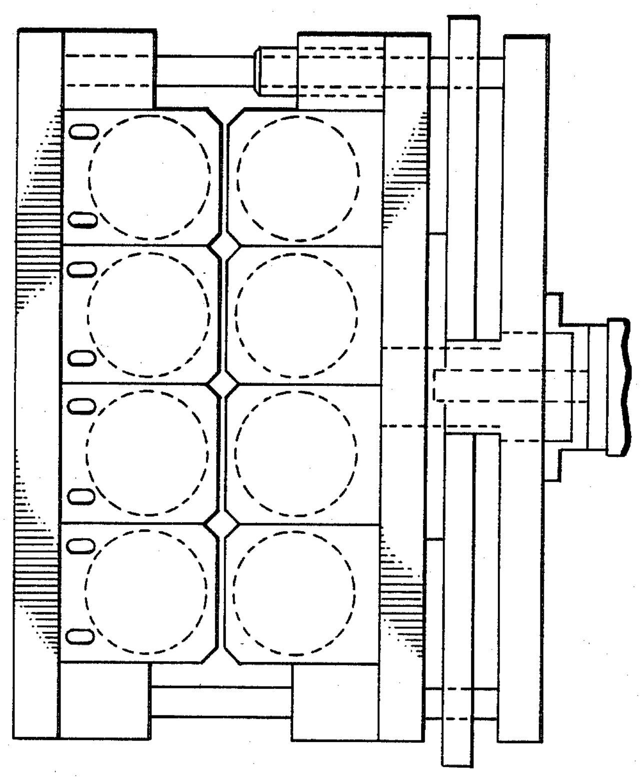
Figure 10:
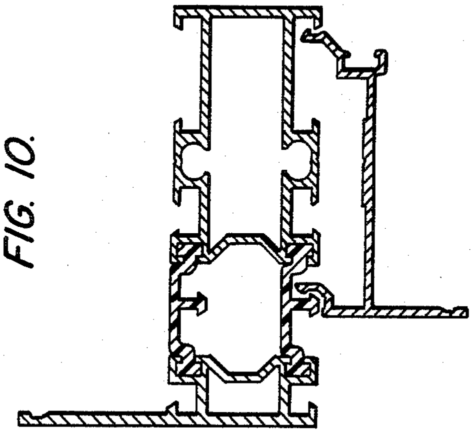
Figure 12:
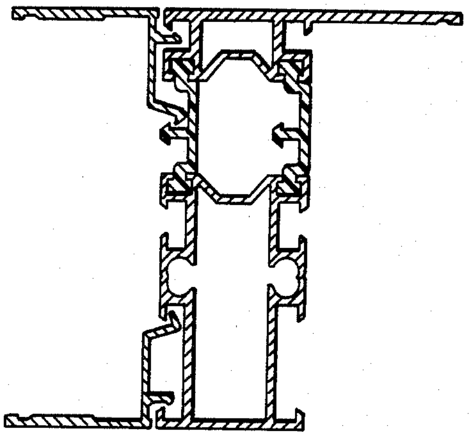
Figure 9:
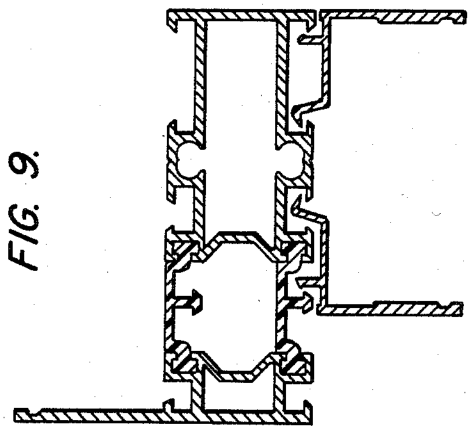
Figure 11:
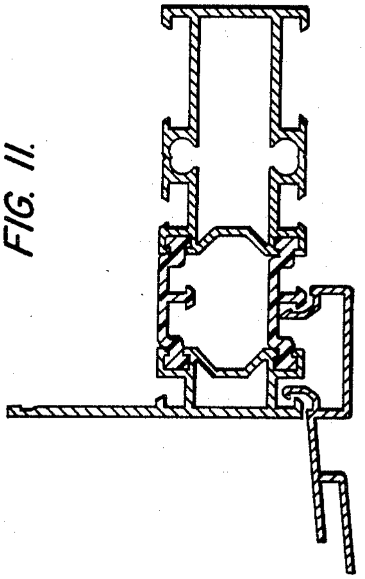
Figure 14:
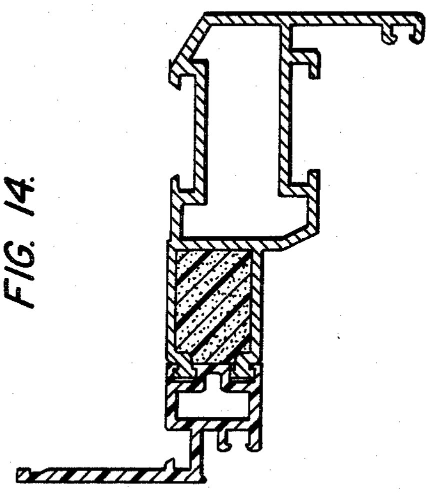
Figure 16:
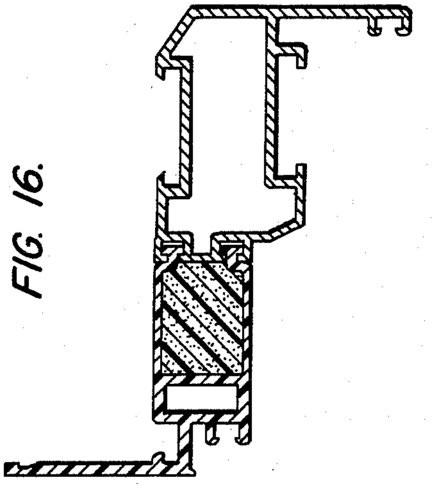
Figure 13:
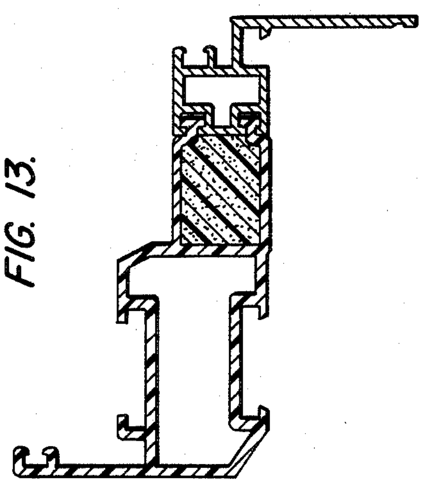
Figure 15:
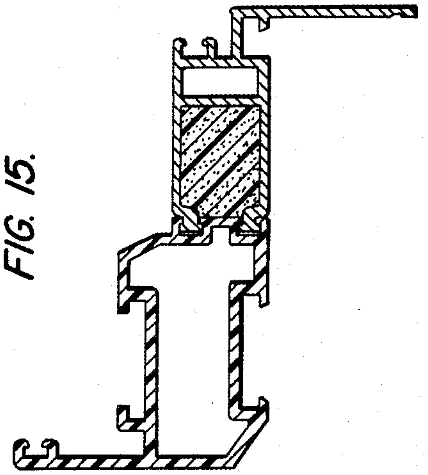

In order to increase the mechanical stability, the aluminum profile may pass below a roll, which acts against the borders of the groove 7 in order to bend the borders to grip the plastic strip 8. The rolling machinery appears from FIGS. 7*a* and 7*b*, while FIG. 8 shows the profile thus treated. From FIG. 8 it is evident that the roll presses against a border 24 of the groove 7 so that the border is bent inwards and decreases the opening of the groove 7 and clamps the neck portion 25 of the plastic strip 8. The roll is so arranged that a certain clamping force is exerted to the neck portion 25 which locks and clamps the plastic strip 8 in position. The rolling machinery can also comprise a measuring equipment, which monitors if the profile has achieved the desired dimensions.

The rolling machinery appears more closely from FIGS. *7a* and *b* and comprises several rolls 26, which in several steps upset the border 24 to the shape shown in FIG. 8. Each roll can be divided into two portions which is shown by the line 27.

The fixture can be a portion of an automatic machine, which comprises three different magazines which circulate in a closed loop circuit. The first magazine is loaded while simultaneously the second magazine is occupied by the foaming step and the third magazine is positioned in an outfeed station for delivery to the rolling machinery. Between the loading step and the foaming step or at any other suitable position, there can be provided a heat station in order to obtain the right temperature for foaming.

The aluminum profile portions 5, 6 are suitably anodized before the mounting according to the present invention. However, the surface layer can be damaged during the treatment and it is thus sometimes necessary to repair the anodization. It can also be necessary to paint the surfaces after the mounting, which must be done in a relatively high heat. This is however possible with the profile according to the present invention due to the reinforcing action of the hard plastic strips 8 and by means of the mechanical locking which is achieved by the rolling.

As is shown on the drawings, the plastic strip 8 is provided with a projecting stud 11, which extends along the whole length of the plastic strip. As appears from FIG. 1, lower portion, the stud is intended to form a locking together with the further recesses of the profile so that it is possible to connect an uninsulated profile to the insulated profile, such as window sheets, fendering and connection profiles etc. In order that the locking shall fit, the stud 28 is somewhat excentrically positioned. When the stud is not used for locking, it is turned inside the plastic foam. Window sheets, fendering and connection profiles can thus be connected to both the inside and the outside without breaking the cold bridge. FIGS. 9 to 12 show some embodiments of the locking possibility of this stud.

It is evident that an increase of the requirement on insulation in connection with the window up to k-values less than 2.0 entails that a great care must be exerted in order to achieve an acceptable product. A possible development is to use an outer profile of aluminum which is resistant to weather and wind, and a plastic profile which comprises insulating plastic foam. In this embodiment the plastic strips, which are used according to the present invention can be an integral portion of the inner plastic profile. FIGS. 13 to 16 show some embodiments thereof, whereby the profiles of plastic have been drawn with two thin lines, while the aluminum profiles have been drawn by a broad solid line. Further variants are of course possible.

In the specification above, the invention has been described in details by reference to preferred embodiments of the invention. To a person skilled in the art it is obvious that the invention can be modified in many respects within the scope of the invention. The invention is only limited by the appended claims.

I claim:

1. An insulated composite profile having a predetermined outer dimension comprising:

(a) two profile portions having spaced first surfaces, the spacing between which defines said predetermined outer dimension of said composite profile, each profile portion being provided with a second surface and at least two longitudinally extending grooves on said second surface;

(b) two plastic strips of a hard plastic material having two edge portions, said edge portions engaging said grooves in order to interconnect said profile portions;

(c) said grooves having such a shape as to grip said edge portions with a clearance so that the edge portions cannot escape from the grooves in a direction transverse to the length of the groove but can be inserted into said grooves from the end of each profile portion;

(d) said strips and said profile portions defining a longitudinally extending space;

(e) plastic foam filling said space; and (f) the clearance between said edge portions and said grooves being at least partially filled with said plastic foam in order to maintain said spacing between said first surfaces of the profile portions as interconnected by said plastic strips and plastic foam and, thereby, maintain said predetermined outer dimension of the composite profile.

2. An insulated composite profile according to claim 1, wherein the grooves are defined by rim portions, and the rim portions grip the edge portions of the plastic strips.

3. An insulated composite profile according to claim 1, wherein said grooves are undercut, and said edge portions of the plastic strips have a shape complementary to said grooves.

4. An insulated composite profile according to claim 1, wherein the profile portions are aluminum.

5. A method for producing an insulated composite profile having two profile portions, each provided with at least two longitudinally extending grooves on a surface thereof, and two strips of a hard plastic, each having two edge portions engageable with said grooves in order to interconnect said profile portions, the method comprising the steps of:

(a) introducing each edge portion of each plastic strip into one of said grooves of said profile portions from the end thereof by pushing, in order to interconnect the profile portions and form a space between the profile portions and the plastic strips;

(b) placing the interconnected profile portions of step (a) in a fixture in order to determine the outer dimensions of the composite profile; and (c) introducing plastic foam into said space and letting it foam and cure therein, said plastic foam at least partially filling any clearance between the grooves and the edge portions of the plastic strips.

6. A method according to claim 5, wherein the grooves are defined by rim portions, and the method further comprises upsetting at least one of the rim portions of each groove in order to grip the introduced edge portion of the associated plastic strip.

7. A method according to claim 6, wherein said rim portion is upset by a roller.

* * * * *